W. H. DOWNING.
Improvement in Drill-Rod Coupling.
No. 132,755. Patented Nov. 5, 1872.
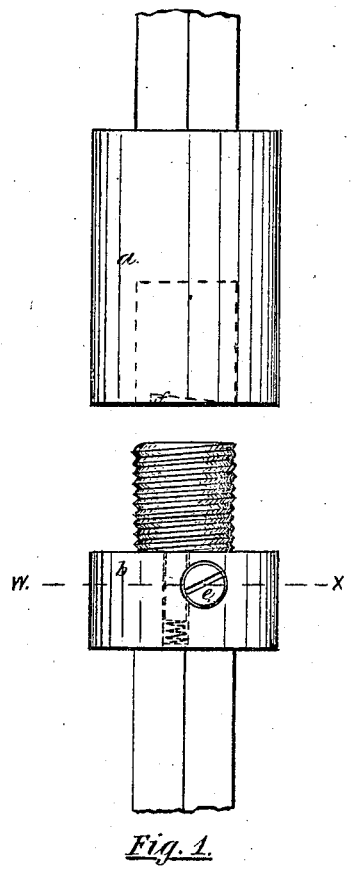
Fig. 1.
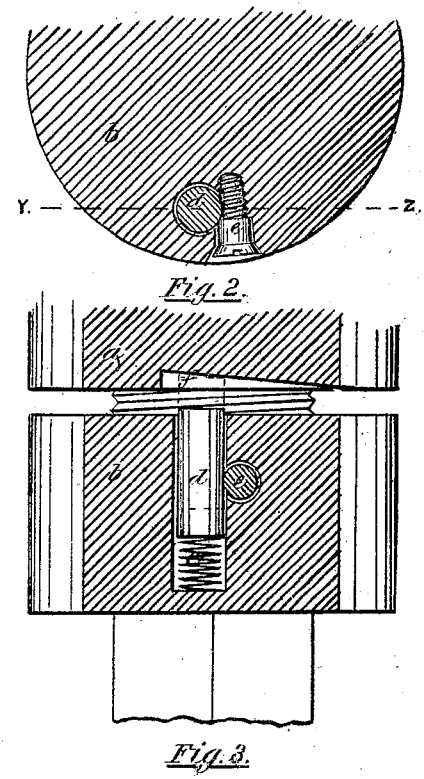
Fig. 2.
Fig. 3.
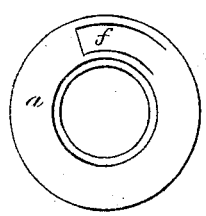
Fig. 4.

UNITED STATES PATENT OFFICE.

WILLIAM H. DOWNING, OF SHAMBURG, PENNSYLVANIA, ASSIGNOR OF ONE-HALF HIS RIGHT TO BENJAMIN MASSETH, OF SAME PLACE.

IMPROVEMENT IN DRILL-ROD COUPLINGS.

Specification forming part of Letters Patent No. 132,755, dated November 5, 1872.

*To all whom it may concern:*

Be it known that I, WILLIAM H. DOWNING, of Shamburg, in the county of Venango and State of Pennsylvania, have invented certain Improvements in Devices for Connecting and Securing Drilling-Tools, of which the following is a specification:

My invention relates to a novel mode of securing or locking together the several pieces composing a set of tools used in drilling artesian wells. It may be applied and used to advantage in any case where it is necessary to connect a series of rods by screw-joints, the object of the device being to prevent the unscrewing and separation of the several pieces while in use.

Figure 1 represents an external view of the device, showing the pieces of the tools detached. Fig. 2 is a transverse section on line W X of Fig. 1. Fig. 3 is a vertical section taken on line Y Z of Fig. 2. Fig. 4 is an inverted plan of the upper portion of the device. Figs. 2 and 3 are drawn to a larger scale than Figs. 1 and 4, to show details more clearly, and represent only a portion of the full section.

$a$ represents the lower or "box" end, and $b$ the upper or pin end of two pieces forming the set, the screw-pin upon the piece $b$ screwing into a socket, shown in dotted lines, in the end of the piece $a$, the whole when screwed together forming a continuous smooth surface upon the outside. A hole is drilled into the shoulder of the piece $b$ in such manner as to be closed by the box $a$ when the two are screwed together. Within this hole a spiral spring, $c$, and a loose pin, $d$, are placed. A screw, $e$, is inserted from the outside of the piece $b$ in such manner that when the screw is turned hard to the right it acts as a cam and presses against the pin $d$, holding it in any desired position, and when unscrewed or turned to the left it releases and allows the pin to fly out. A tapering groove, $f$, is cut in the lower edge of the box-piece $a$, of the form shown in Figs. 3 and 4, into which the pin $d$ springs when released by the screw $e$ on screwing the parts together, the groove $f$ and the pin $d$ when released acting as a ratchet to prevent the pieces $a$ and $b$ from being accidentally unscrewed and separated.

The operation of the device is as follows: The pin $d$ is first pressed down into its place and held there by turning the screw $e$ to the right; the pieces $a$ and $b$ are then screwed together and the pin released by turning the screw $e$ to the left, when the pin springs upward against the end of the box $a$. Should the pieces $a$ and $b$ become loosened and commence to unscrew, the pin $d$ will spring into the groove $f$ and prevent further unscrewing. The pieces $a$ and $b$ may be unscrewed and separated at pleasure by first securing the pin $d$ from springing out by means of the cam-screw $e$. The whole being entirely concealed it offers no impediment in using the tools.

I claim as my invention—

The pin $d$, spring $c$, cam or set screw $e$, and groove $f$, arranged within the box and pin ends $a$ and $b$, and operating substantially as and for the purposes set forth.

WILLIAM H. DOWNING.

Witnesses:
C. L. POOR,
JOHN W. LOLLEY.